(12) United States Patent
Yim

(10) Patent No.: US 9,984,311 B2
(45) Date of Patent: May 29, 2018

(54) METHOD AND SYSTEM FOR IMAGE SEGMENTATION USING A DIRECTED GRAPH

(71) Applicant: Peter Yim, Belle Mead, NJ (US)

(72) Inventor: Peter Yim, Belle Mead, NJ (US)

( * ) Notice: Subject to any disclaimer, the term of this patent is extended or adjusted under 35 U.S.C. 154(b) by 12 days.

(21) Appl. No.: 15/062,371

(22) Filed: Mar. 7, 2016

(65) Prior Publication Data

US 2016/0300124 A1 Oct. 13, 2016

Related U.S. Application Data

(60) Provisional application No. 62/146,257, filed on Apr. 11, 2015.

(51) Int. Cl.
| | |
|---|---|
| *G06K 9/00* | (2006.01) |
| *G06K 9/62* | (2006.01) |
| *G06F 17/30* | (2006.01) |
| *G06T 7/11* | (2017.01) |
| *G06T 7/162* | (2017.01) |
| *G06K 9/46* | (2006.01) |
| *A61B 6/00* | (2006.01) |

(52) U.S. Cl.
CPC ..... *G06K 9/6224* (2013.01); *G06F 17/30271* (2013.01); *G06F 17/30958* (2013.01); *G06K 9/469* (2013.01); *G06T 7/11* (2017.01); *G06T 7/162* (2017.01); *G06T 2207/10076* (2013.01); *G06T 2207/10081* (2013.01); *G06T 2207/10088* (2013.01); *G06T 2207/10132* (2013.01)

(58) Field of Classification Search
CPC .......... A61B 5/00; G06T 7/0093; G06K 9/00
USPC ....... 382/100, 103, 128–134, 154, 162, 168, 382/173, 181, 199, 232, 254, 274, 276, 382/285, 291, 305, 312; 378/4, 21, 62; 600/440
See application file for complete search history.

(56) References Cited

U.S. PATENT DOCUMENTS

| | | | |
|---|---|---|---|
| 8,532,362 B2 * | 9/2013 | Verbruggen | A61B 6/505 382/128 |
| 2011/0194741 A1 * | 8/2011 | Ekin | A61B 5/00 382/128 |
| 2011/0268328 A1 * | 11/2011 | Bar-Aviv | G06T 5/50 382/128 |
| 2012/0070044 A1 * | 3/2012 | Avinash | G06K 9/3233 382/128 |
| 2012/0078099 A1 * | 3/2012 | Suri | A61B 8/0891 600/440 |
| 2013/0216116 A1 * | 8/2013 | Yim | G06T 7/0093 382/131 |

* cited by examiner

*Primary Examiner* — Seyed Azarian
(74) *Attorney, Agent, or Firm* — Mitchell Law PLLC

(57) ABSTRACT

Method and system is disclosed for image segmentation. The method includes acquiring a digital image, constructing a directed graph from the digital image, calculating a plurality of cost functions, constructing an electrical network based upon the constructed directed graph and the plurality of calculated cost functions, simulating the electrical network using fixed-point linearization, and thresholding the voltages in the simulated electrical network to produce image segmentation. Simulation may be executed in parallel to achieve desirable computational efficiencies.

5 Claims, 5 Drawing Sheets

METHOD AND SYSTEM FOR IMAGE SEGMENTATION USING A DIRECTED GRAPH

CROSS REFERENCE TO RELATED APPLICATIONS

This application claims the benefit of U.S. Provisional Patent Application No. 62/146,257, filed Apr. 11, 2015, and incorporated herein by reference in its entirety.

TECHNICAL FIELD

This disclosure relates to segmenting digital images, and more particularly to image segmentation using parallel processing of a directed graph.

BACKGROUND

The statements in this section merely provide background information related to the present disclosure and may not constitute prior art.

Image segmentation is a branch of digital image processing that performs the task of categorizing, or classifying, the elements of a digital image into one or more class types. The class types can correspond to objects within an image. Classifying elements in a digital image has permitted a new understanding of biology, physiology, anatomy, as well as facilitated studies of complex disease processes and medical diagnostic purposes in clinical care settings. Modern medicine and clinical care are particularly poised to benefit from greater imaging capabilities.

Initial volumetric images from may be provided from known imaging devices such as X-ray computed tomography (CT), magnetic resonance (MR), 3-D ultrasound, positron emission tomography (PET) and many other imaging devices. The imaging device typically provides a 3D image data set from which to perform image segmentation in typical medical imaging applications with the classification types related to anatomical structure. For example, in thoracic medical images, it is convenient to segment the image voxels into classes such as bone, lung parenchyma, soft tissue, bronchial vessels, blood vessels, etc. There are many reasons to perform such a task, such as surgical planning, treatment progress, and patient diagnosis.

Various known analytical techniques are utilized to perform image segmentation. One known technique includes analyzing 3-D medical images as sequences of 2-D image slices that form the 3-D data. This is undesirable as contextual slice-to-slice information is lacking when analyzing sequences of adjacent 2-D images. Performing the segmentation directly in the 3-D space tends to bring more consistent segmentation results, yielding object surfaces instead of sets of individual contours. 3-D image segmentation techniques—for example, techniques known by the terms region growing, level sets, fuzzy connectivity, snakes, balloons, active shape and active appearance models—are known. None of them, however, offers a segmentation solution that achieves optimal results. The desire for optimal segmentation of an organ or a region of pathology, for example, is critical in medical image segmentation.

Recently, graph-based approaches have been developed in medical image segmentation. A common theme of these graph-based approaches is the formation of a weighted graph in which each vertex is associated with an image pixel and each graph edge has a weight relative to the corresponding pixels of that edge to belong to the same object. The resulting graph is partitioned into components in a way that optimizes specified, preselected criteria of the segmentation.

When applied to graphs, the minimum s-t cut produces a partition of the graph at a mathematical optimal partition of two parts. There are many algorithms that have been developed to perform the minimum s-t cut of a graph. To date, the algorithms that have proven to have the greatest execution speed for performing the minimum s-t cut involve the simulation of flow through an analogous transportation or communication network. In this analogy, the weights of the edges of the graph are considered to be maximum allowable flows. A relatively new approach to the computation of the minimum s-t cut involves the use of numerical operations. Algorithms that use numerical operations for obtaining the minimum s-t cut or an approximation to the minimum s-t cut have been developed based on the linear programming methods.

Like other graph-based approaches, the energy minimization framework utilizing s-t cuts is fairly computationally complex when utilized in medical applications. Therefore, a need exists to more efficiently execute image segmentation using an energy-based framework utilizing s-t cuts of directed graphs that includes information about a direction in which the weight of a boundary at any point in the image depends on which side of the boundary is the inside and which side is the outside.

SUMMARY

Method and system is disclosed for image segmentation. The method includes acquiring a digital image, constructing a directed graph from the digital image, calculating a plurality of cost functions, constructing an electrical network based upon the constructed directed graph and the plurality of calculated cost functions, simulating the electrical network using fixed-point linearization, and segmenting the image using the simulated electrical network to produce segmented layers. Fixed-point linearization may be executed in parallel to achieve desirable computational efficiencies.

The minimum s-t cut can theoretically be modeled by construction of an analog electrical network that naturally assumes a binary-voltage state equivalent to the minimum s-t cut. The fundamental unit of the analog electrical network is a non-linear resistive device with a current-limiting characteristic. An algorithm is presented here for computational simulation of such an analog network as a basis for segmentation of medical images. The solution to the governing system of equations is obtained by the fixed-point method that allows for linearization of the system of equations. In certain embodiments the use of Ruge-Stuben algebraic multigrid for solution of the linear system of equations may be utilized at each iteration.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
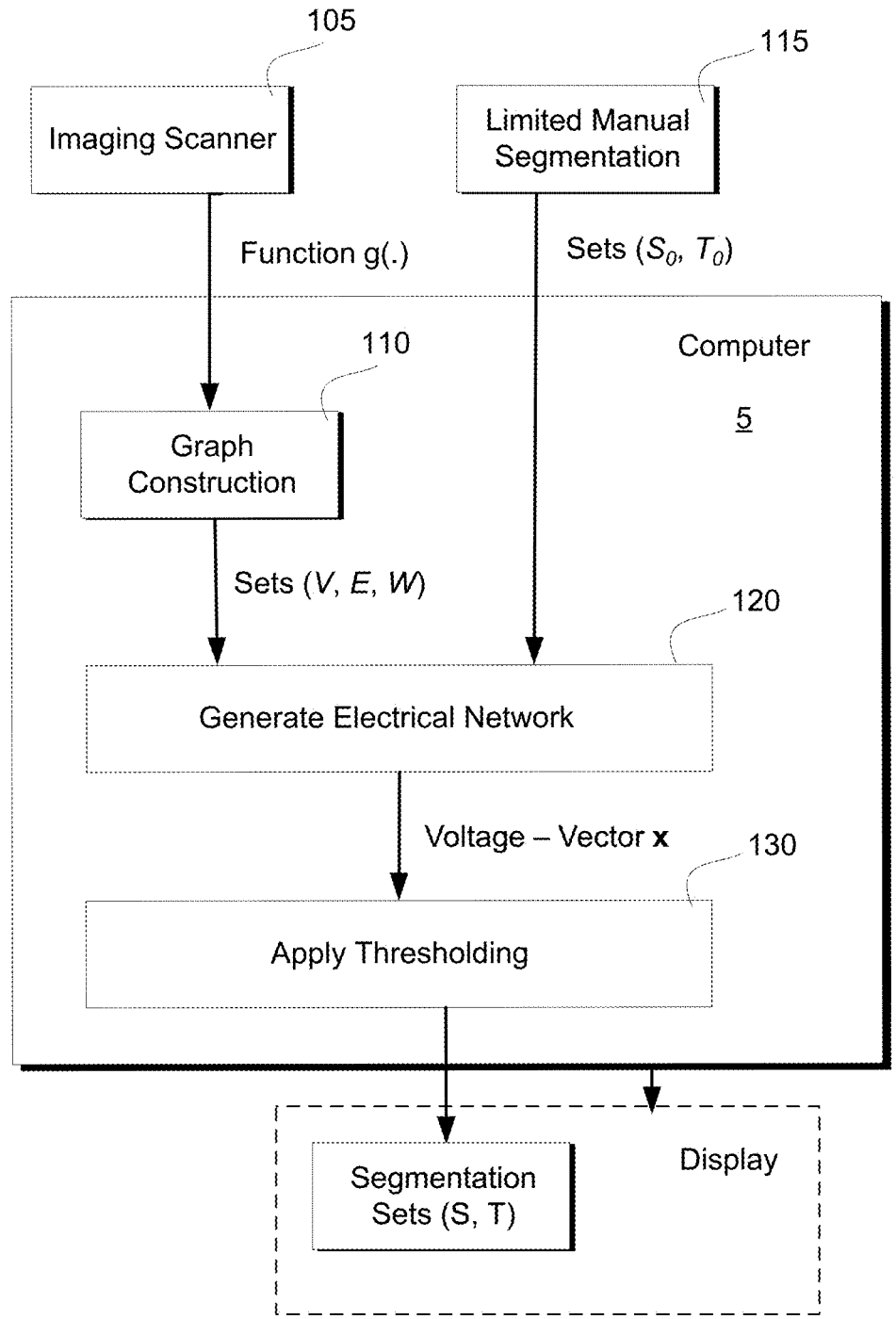
FIG. 1 schematically shows a flowchart of a segmentation algorithm, in accordance with an embodiment the present disclosure.
Figure 2:
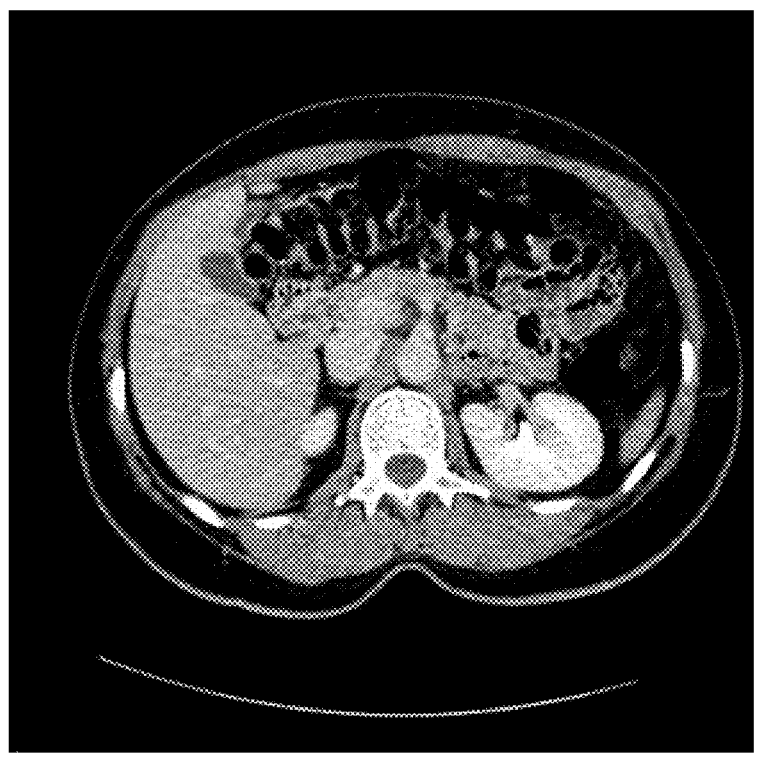
FIG. 2 is an exemplary medical image before applying the segmentation teaching disclosed herein, in accordance with an embodiment the present disclosure.
Figure 3:
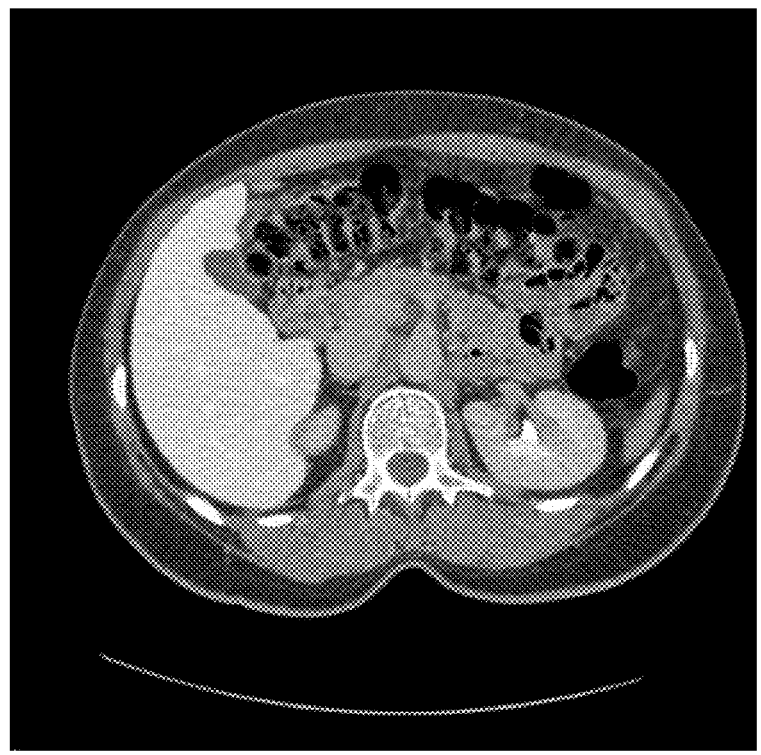
FIG. 3 is an exemplary medical image after applying the segmentation teaching disclosed herein, in accordance with an embodiment the present disclosure.
Figure 4:
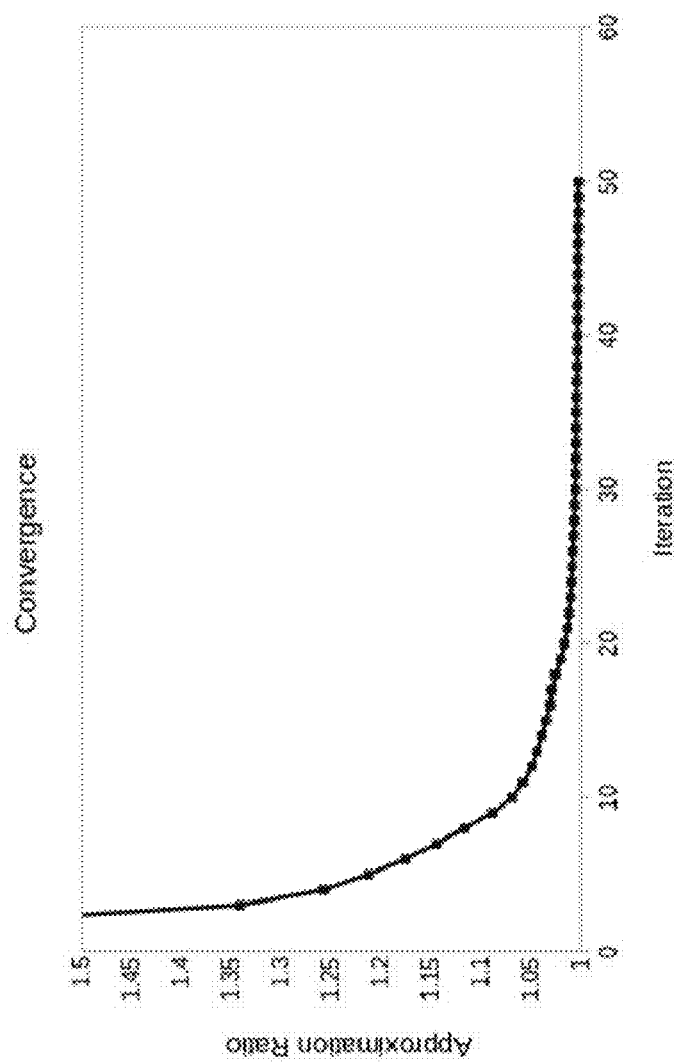
FIG. 4 graphically shows exemplary convergence of a weight of a graph cut obtained by a simulation s-t cut as compared to the weight of minimum s-t cut. The approximation ratio is the weight of the graph cut obtained by the simulation s-t cut divided by the weight of the minimum s-t cut, in accordance with an embodiment the present disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring now to the drawings, wherein the depictions are for the purpose of illustrating certain exemplary embodiments only and not for the purpose of limiting the same, FIG. 1 schematically shows a flowchart of a segmentation algorithm according to an exemplary embodiment. The algorithm begins at step 105 by acquiring an n-dimensional digital image from an imaging scanner. For the purposes of this application, an image is any scalar or vector function on n-dimensional coordinates. The image may be two-dimensional, and/or three-dimensional. The digital image may be provided by any one of a number of known imaging devices including medical-based imaging device such as a magnetic resonance image, a computed tomography image, an optical coherence tomography image, or an ultrasound-originating image. It is to be appreciated that imaging, for use in embodiments of the present disclosure, can be achieved utilizing traditional scanners or any other image acquisition technique as would be appreciated by those having ordinary skill in the art.

A graph is constructed at step 110 from the n-dimensional image or, in one embodiment, a series of images. Each pixel i.e., point, of said image is associated with a vertex of said graph and said graph includes an edge connecting each pair of vertices corresponding to adjacent points in said image. The graph may be defined as G=(V, E) with V representing a set of vertices of a graph, and E representing a set of edges of a graph such that every pixel u or v has a corresponding vertex.

In one embodiment, limited segmentation may be performed by a user-operator 115. The limited segmentation, or initial segmentation, may be outputted to an electrical network 120 and defined as sets of vertices $S_0$ and $T_0$ each having member nodes s and t. In one embodiment, limited segmentation may be optionally performed by assigning foreground and background seeds, either interactively or automatically by acquiring landmarks that belong to the foreground/background.

A weight W representing a sum of the weights of the edges that define the partition obtained by a minimum s-t cut, may be calculated and inputted into the electrical network 120. As one skilled in the art will readily recognize, the minimum s-t cut can be a utilized to identify two components of graph partitioning. As used herein, an s-t cut is defined with respect to two nodes, s and t, of a weighted, directed graph G=(V,E). Thereby, a partition of the vertices of a graph that defines the partition obtained by the minimum s-t cut may be represented by:

$$C_V=(S,T) \quad [1]$$

given:

$$s \in S, t \in T \text{ and } S \cap T = \phi, S \cup T = V \quad [2]$$

the s-t cut may be defined as a set of edges, $C_E$, as:

$$\{(i,j) \in C_E | i \in S, j \in T\} \quad [3]$$

wherein $C_V$ is a partition of the vertices of a graph that defines the partition obtained by the minimum s-t cut, S and T are sets of vertices from the graph G that, respectively, have members s and t, $C_E$ is a subset of the edges in the graph G the defines the partition obtained by the minimum s-t cut, and i and j are vertices in the graph or nodes in the corresponding simulated electrical network as described herein below.

Given that each edge of the graph has an associated non negative weight, w, the weight the s-t cut is the sum of the weights, $w_{ij}$, of the set of edges of the cut:

$$W(S,T)=\Sigma_{(i,j) \in C(S,T)} w_{ij} \quad [4]$$

where $w_{ij}$ are positive real numbers. The minimum s-t cut is the partition with the minimum weight as defined in equation [4].

This formulation of graph partitioning is of particular interest because an exact solution is available based on a linear programming (LP) formulation. The LP formulation is to maximize the flow from nodes s to t through a graph subject to the equations for conservation of flow at each node, where $N_i$ are the nodes that are adjacent to i in the graph and $I_{ij}$ is the flow from node i to node j:

$$0=\Sigma_{j \in N_i} I_{ij} \quad [5]$$

and to the constraints on the flow:

$$-w_{ji} \leq I_{ij} \leq w_{ij} \quad [6]$$

One skilled in the art will recognize that the minimum s-t cut may be obtained using an augmenting-path. Using the augmenting-path, a maximal flow pattern in the network may be obtained by incrementally increasing the flow from the nodes s to t along one given path at a time. An efficient implementation of this approach to obtaining the minimum s-t cut was developed using search trees for applications in imaging in particular.

Another approach to obtaining the minimum s-t cut involves the push-relabel pair of operations that are applied independently to each node in the graph that, in combination, produce the desired s-t flow pattern. The parallel structure of this approach has been used by implementation on a multi-core processor for video applications. This algorithm has also been accelerated using so-called global-relabeling and gap-relabeling and by the use of acyclic sub-graphs or trees to organize the flow. Approximation methods have also been applied to the minimum s-t cut problem including an implementation that the minimum s-t cut can be formulated as an unconstrained l1-norm minimization. Another approach to obtaining the minimum s-t cut is by minimization of the functional:

$$G(v)=\Sigma_{(i,j) \in E} w_{ij}|v_i-v_j| \quad [7]$$

with the constraints: $v_s=1$ and $v_t=0$.

In one embodiment, a gradient descent may be utilized to obtain the minimum s-t cut. Minimization of the functional is obtained in an approximate manner by solution of the system of equations:

$$\tilde{\nabla} G(v) = 0 \qquad [8]$$

where $\tilde{\nabla}$ is an operator that approximates the gradient of G but is continuous for all v, along with the constraints on $v_s$ and $v_t$.

A method for obtaining the minimum s-t cut for a directed graph using a physical model has also been developed. The method includes fabricating a non-linear resistive network where each resistive element represents an edge of the graph. The non-linear resistive network will naturally approach a binary-voltage state corresponding to the minimum s-t cut of the graph as the input voltage applied between the source and sink nodes approaches infinity. To obtain this behavior, the resistive elements must have the following characteristics: (Property 1) The current through the resistor is a non-decreasing function of the voltage across the resistor; and (Property 2) For a given voltage polarity, the current through the resistor is equal to or asymptotically approaches the flow capacity in the direction of the voltage polarity of the corresponding graph edge, as the voltage across the resistor approaches infinity.

One or more of the equations herein above may be used for simulation of the analog network for obtaining the minimum s-t cut in the undirected graph. The algorithm uses undirected graphs and may be implemented using a serial processing. As disclosed herein, may apply the teachings herein to both undirected and directed graphs and for implementation on a parallel processor.

As described herein, the minimum s-t cut may be obtained for directed graphs using a resistive-network model. A graph is a set of points (nodes) and a set of edges (pairs of nodes). A directed graph is a graph in which there is a magnitude and a direction associated with each edge.

An analog electrical network is formed by a set of non-linear resistors that represent the edges in a given graph. To simulate the analog minimum s-t cut network the current-voltage characteristic of the resistors must satisfy the Frisch criteria described above. The following function, i.e., equation 9, provides valid current-voltage behavior and serves as the basis for the algorithm presented here, for a vector of voltages at the nodes in the network, $x = (x_1, \ldots, x_{|V|})$.

$$I_{ij}(x_{ij}) = \frac{m_{ij} x_{ij}}{1 + |x_{ij}|} + \delta_{ij} \qquad [9]$$

Differences in voltages between two nodes is represented as $x_{ij} = x_i - x_j$. Where:

$$m_{ij} = \frac{w_{ij} + w_{ji}}{2} \qquad [10]$$

and $$\delta_{ij} = \frac{w_{ij} - w_{ji}}{2} \qquad [11]$$

$w_{ij}$ is the weight of the edge in the direction from i to j and $w_{ji}$ is the weight of the edge in the direction from j to i, $\delta_{ij}$ and $m_{ij}$ are defined mathematically with in terms of $w_{ij}$ and $w_{ji}$.

I represents current.

This current-voltage characteristic provides a current-limiting characteristic, consistent with Properties 1 and 2, and may be expressed as:

$$\lim_{x_{ij} \to +\infty} I_{ij}(x_{ij}) = w_{ij} \qquad [12]$$

and $$\lim_{x_{ij} \to -\infty} I_{ij}(x_{ij}) = -w_{ji} \qquad [13]$$

The analog network is thus described by a non-linear system of equations where the source and sink nodes are set to the high and low input voltages respectively and voltages at the remaining nodes are governed by Kirchhoff's current law:

$$F(x) = 0 \qquad [14]$$

where $F = (f_1, \ldots, f_{|V|})$ and:

$$f_i(x) = \begin{cases} V^+ - x_i, & i = s \\ V^- - x_i, & i = t \\ \sum_{j \in N_i} I_{ij}(x_{ij}), & i \in V/\{s, t\} \end{cases} \qquad [15]$$

Where $V^+$ is a large positive number such as 1,000,000 and $V^-$ is the additive inverse of $V^+$ (in this case −1,000,000).

To aid linearization, the above system of equations 14 and 15 can be written as:

$$A(x)x = b \qquad [16]$$

where A is a $|V| \times |V|$ matrix of functions with the following non-zero elements:

$$a_{ij}(x) = \begin{cases} 1 & i, j \in \{s, t\}, i = j \\ \frac{-m_{ij}}{1 + |x_{ij}|} & j \in N_i \, i \notin \{s, t\}, i \neq j \\ \sum_{j \in N_i} \frac{m_{ij}}{1 + |x_{ij}|} & i, j \notin \{s, t\}, i = j \end{cases}, \qquad [17]$$

The vector $b = (b_1, \ldots, b_{|V|})$ represents the constants:

$$f_i(x) = \begin{cases} V^+ & i = s \\ V^- & i = t \\ -\sum_{j \in N_i} \delta_{ij} & i \in V/\{s, t\} \end{cases} \qquad [18]$$

Where $N_i$ represents the set of pixels that are adjacent to the pixel i and the nodes s and t.

A solution can then be obtained in an iterative manner comparable to a fixed-point approach to obtaining a minimum s-t cut. The technique is as follows and requires the solution of a linear system of equations at each iteration:

$$A(\tilde{x}_k) \tilde{x}_{k+1} = b \qquad [19]$$

wherein $\tilde{x}_k$ is a vector representing the approximate voltage at all nodes in the simulated electrical network at the $k^{th}$ fixed-point iteration.

In the solution to the equations governing the system of non-linear resistors, voltage gaps between adjacent nodes represent the degree to which the flow between the two nodes has saturated or reached its limiting flow capacity. In the limit, the voltage assumes a state in which it is homogeneous within each of two regions connected to the source and sink, respectively, and a voltage gap equal to the input voltage occurs along the minimum s-t cut. An approach to determining the minimum s-t cut from the simulation is to use a graph cut based on thresholding of the voltage at step 130 as shown in FIG. 1. Such a cut based on the simulation of the non-linear resistive network is represented by: $C_k^{simulation} = (S_k^{simulation}, T_k^{simulation})$, where:

$$S_k^{simulation} = \{i | \tilde{x}_{k,j} \geq 0\} \text{ and } T_k^{simulation} = \{i | \tilde{x}_{k,j} > 0\} \qquad [20]$$

wherein $C_k^{simulation}$ is a partition of the vertices of a graph that is obtained by thresholding of the voltages in the simulated electrical network, $S_k^{simulation}$ is a sub-set of the vertices of the graph that is obtained by thresholding of the voltage in the simulated electrical network that contains the vertex s, and $T_k^{simulation}$ is a sub-set of the vertices of the graph that is obtained by thresholding of the voltage in the simulated electrical network that contains the vertex t.

The minimum s-t cut has significant potential value for image segmentation. In one approach, image segmentation can be formulated as the detection of an optimal boundary that lies between two user-defined regions or sets of pixels $U_0$ and $V_0$. Given a segmentation of the images described by:

$$\Lambda = (U, V) \qquad [21]$$

and where:

$$U_0 \subset U, V_0 \subset V \text{ and } U \cap V = \phi, U \cup V = P \qquad [22]$$

where P is the set of pixels in the image, a boundary B can be defined as a set of all pairs of pixels as follows:

$$B = \{(u,v) \in U \times V | |r(u) - r(v)| < d\} \qquad [23]$$

wherein the function r is the position of a given pixel, and d is distance threshold between any given pair of pixels below which the pixels are considered to be adjacent.

The cost of a given boundary can be defined in terms of the pair of image intensities, g, of each pair of pixels along the boundary:

$$C(B) = \sum_{(u,v) \in B} c(g(u), g(v)) \qquad [24]$$

In this formulation of image segmentation, the minimum-cost boundary is equivalent to the minimum s-t cut in the analogous graph. As such, the weight of the edges in the analogous graph is the cost function associated with pairs of pixels.

As one skilled in the art will readily recognize, various image thresholding techniques and pixel conditioning processes may be allied to the image. In one embodiment, one or more filters may be applied to an image including filters based upon pixel thresholding such as variance in pixel color intensity. In one embodiment, pixels are removed or conditioned from the image when an associated pixel color intensity value is greater than a predetermined threshold. For pixels associated with multiple colors, a pixel color intensity of any particular color that varies greater than the predetermined threshold may be removed from the image. In one embodiment, an analysis of pixel intensity changes occurring between or among a sequence of images may be used. For example, pixels associated with a pixel color intensity that changes greater than a predetermined threshold from the sequential images may be removed from the image. In one embodiment, pixels associated with identified edges or transitions in visual data may be removed or conditioned. For example, pixels having color intensity values that correspond to edges using one of several known edge detection filters, e.g., a Sobel filter, may be removed or conditioned.

In one exemplary implementation, the simulation s-t cut was implemented using Hypre (Version 2.9, Lawrence Livermore National Laboratory); a software library for solving large sparse systems of linear equations. Linear systems of equations that arise at each point in the fixed-point algorithm were solved with Boomeramg, a parallel implementation of algebraic multigrid. Coarsefine splitting was based CLJP with a strong threshold of 0.25. The algebraic multigrid solution was obtained with a single v-cycle. Simulations were performed for an input voltage magnitude of 1,000,000 and 8-neighbor adjacency. The algorithm was implemented on a single processor (Intel Core I3-2130 CPU at 3.40 GHz).

Image segmentation may include the detection of an optimal boundary that lies between two user-defined regions or sets of pixels S0 and T0. A graph is defined such that the nodes of the graph are the set of pixels in the image, P:

$$V_{image} = P \qquad [25]$$

and the set of edges in the graph are pairs of adjacent pixels defined by a threshold distance d:

$$E_{image} = \{(i,j) \in P \times P | |r_i - r_j| < d, i \neq j\} \qquad [26]$$

where ri is the position of a given pixel, i within the spatial domain of the image. The weight of each edge is a function of the respective image intensities of pair of corresponding pixels. In this formulation of image segmentation, the minimum-cost boundary is equivalent to the minimum s-t cut in the analogous graph.

Shape reconstruction was performed with the minimum s-t cut from an exemplary photometric stereo image. A graph is obtained such that:

$$w_{ij} = \begin{cases} 5.0, & (x, y)_i \neq (x, y)_j \\ \Delta_i + \Delta_j, & (x, y)_i = (x, y)_j \end{cases} \qquad [27]$$

and $$\Delta_i = |R_{(x_i, y_i)} - L_{(x_i + z_i, y_i)}| \qquad [28]$$

Where $R(x_i, y_i)$ and $L(x_i, y_i)$ are the color vectors at the position (xi, yi) for the right and left components of the photometric stereo. The source region was defined to be all points for k=0 and the sink region was defined to be all points for k=25. The factor of 5.0 was chosen by trial-end-error. The simulation s-t cut was implemented in the same manner as for the multi-section computed tomography segmentation.

Figure 5:
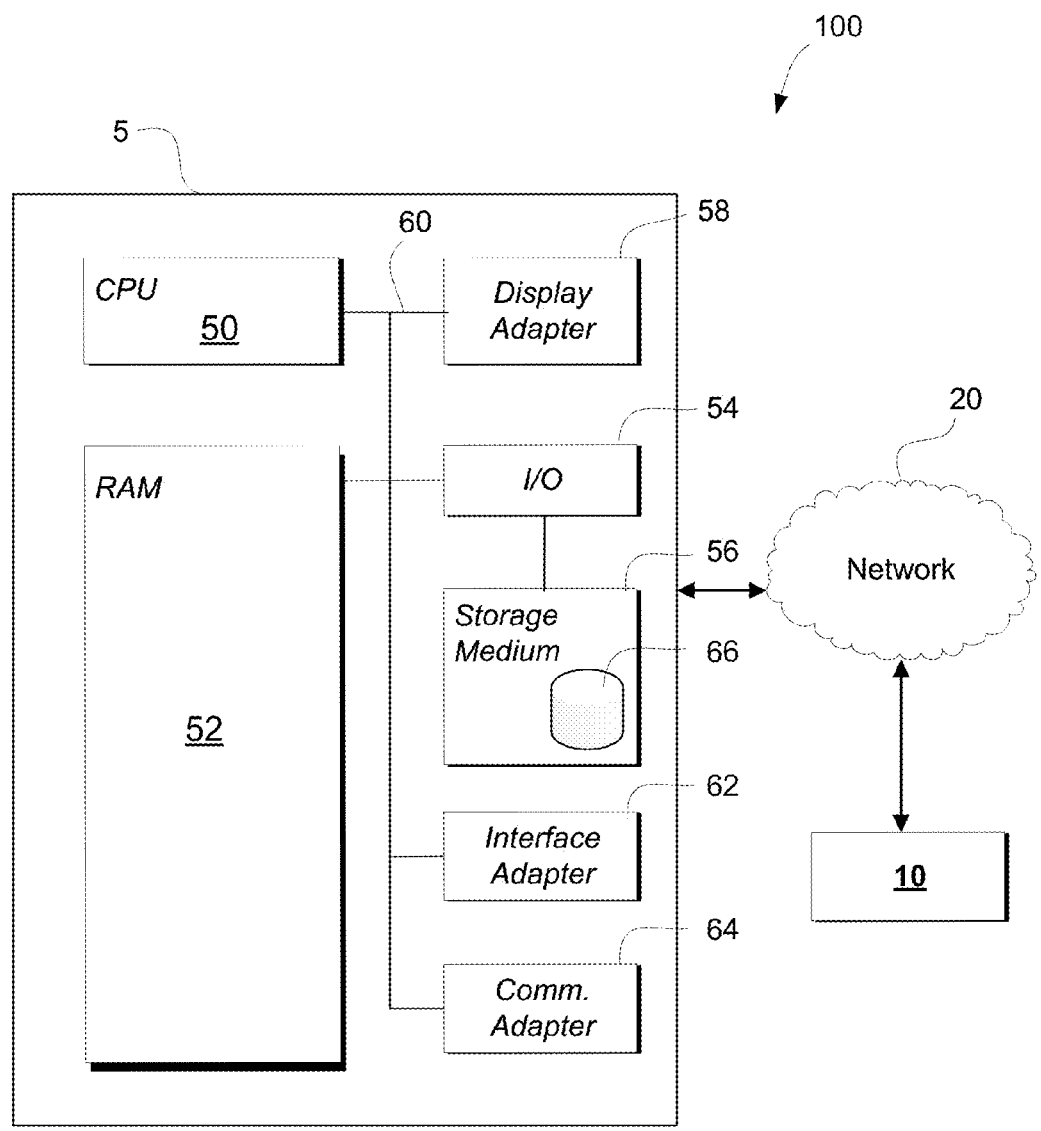
FIG. 5 schematically shows an exemplary computing system in accordance with an embodiment of the present disclosure.

FIG. 5 schematically shows an exemplary computing system 100 that may help implement the methodologies of the present disclosure. The system 100 includes a computing device 5, a network 20, and an imaging scanner 10. As shown in FIG. 1, the computing device 5 may be directly communicatively connected and communicatively connected via the network 20. The imaging scanner 10 is may be wired or wirelessly communicatively connected to the network 20. Components of the communication system 100 are shown in FIG. 1 as single elements. Such illustration is for ease of description and it should be recognized that the system 100 may include multiple additional implementations of the components, e.g., a mobile device may be physically connected to the network 20 during selected periods of operation.

The network 20 may be any suitable series of points or nodes interconnected by communication paths. The network 20 may be interconnected with other networks and contain sub networks network such as, for example, a publicly accessible distributed network like the Internet or other telecommunications networks (e.g., intranets, virtual nets, overlay networks and the like). The network 20 may facilitates the exchange of data between the imaging scanner 10 and the computing device 5 although in various embodiments the imaging scanner 10 may be directly connected to the computing device 5.

The server system 5 may be one or more of various embodiments of a computer including high-speed microcomputers, minicomputers, mainframes, and/or data storage devices. The computing device 5 preferably executes database functions including storing and maintaining a database and processes requests from the imaging scanner 10 to extract data from, or update, a database as described herein below. The server may additionally provide processing functions for the imaging scanner 10.

In addition, the imaging scanner 10 may include one or more applications that the consumer may operate. Operation may include downloading, installing, turning on, unlocking, activating, or otherwise using the application. The application may comprise at least one of an algorithm, software, computer code, and/or the like, for example, mobile application software. In the alternative, the application may be a website accessible through the world wide web.

The computing device 5 includes a central processing unit (CPU) 50, random access memory (RAM) 52, input/output circuitry 54 for connecting peripheral devices such as a storage medium 56 to a system bus 60, a display adapter 58 for connecting the system bus 60 to a display device, a user interface adapter 62 for connecting user input devices such as a keyboard, a mouse, and/or a microphone, to the system bus 60, and a communication adapter 64 for connecting the computing device 5 to the network 20. In one embodiment, the communication adapter 64 is a wireless adapter configured for extraterrestrial communication such as in a communications satellite. The storage medium 56 is configured to store, access, and modify a database 66, and is preferably configured to store, access, and modify structured or unstructured databases for data including, for example, relational data, tabular data, audio/video data, and graphical data.

The central processing unit 50 is preferably one or more general-purpose microprocessor or central processing unit(s) and has a set of control algorithms, comprising resident program instructions and calibrations stored in the memory 52 and executed to provide the desired functions including parallel processing functions. As one skilled in the art will recognize, the central processing unit 50 may have any number of processing "cores" or electronic architecture configured to execute processes in parallel. In one embodiment, an application program interface (API) is preferably executed by the operating system for computer applications to make requests of the operating system or other computer applications. The description of the central processing unit 50 is meant to be illustrative, and not restrictive to the disclosure, and those skilled in the art will appreciate that the disclosure may also be implemented on platforms and operating systems other than those mentioned.

The present disclosure is directed to a number of imaging applications. Applications include segmentation of single surfaces, e.g., volumetric CT images, intravascular ultrasound or magnetic resonance and its 4-D extension, or tracking of such surfaces over time during the breathing cycle or over the cardiac cycle; segmentation of liver or kidney surfaces, tumor surfaces, as well as surfaces of bones, joints, or associated cartilages; surfaces separating cerebro-spinal fluid, gray matter and white matter in the brain, or surfaces of deep anatomical structures in the brain. The simulated minimum s-t cut may be utilized in non-image segmentation applications such as shape reconstruction from e.g., stereo views.

In one embodiment, the linearized equations is executed with a distributed or shared memory parallel computer using a PETSC software library. The PETSC software is configured for obtaining the solution with the generalized minimal residual method using the BoomerAMG algebraic multigrid preconditioner with a single V-cycle.

It is to be understood that while the present disclosure is described with particularity with respect to medical imaging, the principles set forth in detail herein can be applied to other imaging applications. For example, other areas of application include geological, satellite imaging, entertainment, image-guided therapy/surgery and other applications as would be appreciated by those skilled in the art.

The disclosure has described certain preferred embodiments and modifications thereto. Further modifications and alterations may occur to others upon reading and understanding the specification. Therefore, it is intended that the disclosure not be limited to the particular embodiment(s) disclosed for carrying out this disclosure, but that the disclosure will include all embodiments falling within the scope of the appended claims.

The invention claimed is:

1. Non-transitory computer-readable storage media having instructions stored thereon that, when executed by a processor, perform a method comprising:
   acquiring an N-dimensional digital image representative of a medical image, said image comprising a plurality of data items associated with an N-dimensional domain of points;
   constructing a directed graph from the N-dimensional digital image, wherein each point of said image is associated with a vertex of said directed graph and said directed graph includes a directed edge connecting each vertex to all adjacent vertices corresponding to adjacent points in said image, wherein the directed edge has a direction toward the adjacent vertex;
   calculating a plurality of cost functions, wherein each calculated cost function of the plurality of cost functions is related to each directed edge;
   constructing an electrical network based upon the constructed directed graph and the plurality of cost functions, wherein one or more points in the graph are connected to a source node and one or more points in the graph are connected to a sink node, wherein the electrical network comprises operational rules including current-voltage behavior;
   generating a set of nodes in the electrical network and associating the nodes to a set of vertices in the constructed directed graph;
   generating a set of devices in the electrical network and associating the devices with a set of edges in the constructed directed graph, wherein the devices are governed by a set of current-voltage characteristics, the current-voltage characteristics based upon a set of edge weights;

simulating the electrical network to estimate a minimum-weight s-t cut using fixed-point linearization approximation, wherein the approximation is executed, in part, by using a software library configured for obtaining a solution with a generalized minimal residual technique;

segmenting the N-dimensional digital image based upon the simulating to produce segmented layers; and wherein the current-voltage behavior, between pairs of nodes in the simulated electrical network, is defined as:

$$I_{ij}(x_{ij}) = \frac{m_{ij}x_{ij}}{1+|x_{ij}|} + \delta_{ij}$$

for the nodes in the network, $x=(x_1, \ldots x_{|v|})$, wherein differences in voltages between two nodes is represented as $x_{ij}=x_i-x_j$, where:

$$m_{ij} = \frac{w_{ij}+w_{ji}}{2}$$

and $$\delta_{ij} = \frac{w_{ij}-w_{ji}}{2}$$

wherein i and j are vertices in the directed graph or nodes in the simulated electrical network, $w_{ij}$ is a weight of the directed edge (i, j), x is a vector representing electrical voltages at a defined node in the simulated electrical network, wherein $w_{ij}$ is the weight of the edge in the direction from i to j and $w_{ji}$ is the weight of the edge in the direction from j to i, $\delta_{ij}$ and $m_{ij}$ are defined mathematically with in terms of $w_{ij}$ and $w_{ji}$ I represents current.

2. The non-transitory computer-readable storage media as recited in claim 1, wherein simulating the electrical network using fixed-point linearization further comprises the following steps:

obtaining governing equations of the electrical network;
linearizing the governing equations into a linearized equation; and
solving the linearized equation for a solution.

3. The non-transitory computer-readable storage media as recited in claim 2, further comprising: determining a minimum s-t cut using a graph cut based on thresholding voltage within the electrical network.

4. The non-transitory computer-readable storage media as recited in claim 2, wherein the cost function is based upon a direction and a magnitude associated with each directed edge.

5. A system for image segmentation comprising:
one or more computing devices;
an imaging unit, wherein the imaging unit comprises at least a computer processor which, when executed, performs a method, the method comprising:
acquiring an N-dimensional digital image, said image comprising a plurality of data items associated with an N-dimensional domain of points, wherein said image has a rectangular format;

constructing a directed graph from the N-dimensional digital image, wherein each point of said image is associated with a vertex of said directed graph and said directed graph includes a directed edge connecting each vertex to all adjacent vertices corresponding to adjacent points in said image, wherein the directed edge has a direction toward the adjacent vertex;

calculating a plurality of cost functions, wherein each calculated cost function of the plurality of cost functions is related to each directed edge;

constructing an electrical network based upon the constructed directed graph and the plurality of calculated cost functions, wherein one or more points in the graph are connected to a source node and one or more points in the graph are connected to a sink node;

generating a set of nodes in the electrical network and associating the nodes to a set of vertices in the constructed directed graph;

generating a set of devices in the electrical network and associating the devices with a set of edges in the constructed directed graph, wherein the devices are governed by a set of current-voltage characteristics, the current-voltage characteristics based upon a set of edge weights;

simulating the electrical network to estimate a minimum-weight s-t cut using fixed-point linearization approximation, wherein the approximation is executed, in part, by using a software library configured for obtaining a solution with a generalized minimal residual technique; and segmenting the N-dimensional digital image based upon the simulating to produce segmented layers; and defining an electrical current between pairs of nodes in the simulated electrical network by:

$$I_{ij}(x_{ij}) = \frac{m_{ij}x_{ij}}{1+|x_{ij}|} + \delta_{ij}$$

for the nodes in the network, $x=(x_1, \ldots x_{|v|})$, wherein differences in voltages between two nodes is represented as $x_{ij}=x_i-x_j$, where:

$$m_{ij} = \frac{w_{ij}+w_{ji}}{2}$$

and $$\delta_{ij} = \frac{w_{ij}-w_{ji}}{2}$$

wherein i and j are vertices in the directed graph or nodes in the simulated electrical network, $w_{ij}$ is a weight of the directed edge (i, j), x is a vector representing electrical voltages at a defined node in the simulated electrical network, wherein $w_{ij}$ is the weight of the edge in the direction from i to j and $w_{ji}$ is the weight of the edge in the direction from j to i, $\delta_{ij}$ and $m_{ij}$ are defined mathematically with in terms of $w_{ij}$ and $w_{ji}$, and I represents current.

* * * * *